(12) United States Patent
Dua et al.

(10) Patent No.: US 9,367,538 B2
(45) Date of Patent: *Jun. 14, 2016

(54) ANALYZING MESSAGES AND/OR DOCUMENTS TO PROVIDE SUGGESTIONS TO MODIFY MESSAGES AND/OR DOCUMENTS TO BE MORE SUITABLE FOR INTENDED RECIPIENTS

(71) Applicant: International Business Machines Corporation, Armonk, NY (US)

(72) Inventors: Saurabh Dua, Durham, NC (US); Mario A. Maldari, Longmont, CO (US); Paul A. Smith, Cary, NC (US); Jarett Stein, Bryn Mawr, PA (US); Sahdevsinh P. Zala, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/605,308

(22) Filed: Jan. 26, 2015

(65) Prior Publication Data

US 2015/0278196 A1 Oct. 1, 2015

Related U.S. Application Data

(63) Continuation of application No. 14/242,384, filed on Apr. 1, 2014.

(51) Int. Cl.
*G06F 17/27* (2006.01)
*G06F 17/28* (2006.01)
(52) U.S. Cl.
CPC ............ *G06F 17/28* (2013.01); *G06F 17/2785* (2013.01)

(58) Field of Classification Search
USPC ........................................................ 704/1–10
See application file for complete search history.

(56) References Cited

U.S. PATENT DOCUMENTS

| 4,674,065 | A | 6/1987 | Lange et al. |
| 6,782,510 | B1 | 8/2004 | Gross et al. |

(Continued)

OTHER PUBLICATIONS

Office Action for U.S. Appl. No. 14/242,384 dated Jul. 14, 2015, pp. 1-17.

(Continued)

*Primary Examiner* — Abul Azad
(74) *Attorney, Agent, or Firm* — Robert A. Voigt, Jr.; Winstead, P.C.

(57) ABSTRACT

A method, system and computer program product for assisting authors in composing suitable messages or documents for intended recipients. A profile to be used in analyzing the message/document is obtained, where the profile contains a set of corrections and correlations to be applied to the message/document for the intended recipients of the message/document. The content of the message/document is analyzed using the obtained profile to assess for any language that may be misunderstood or offensive to the intended recipients. Upon identifying words, phrases, sentences or images in the message/document as being potentially misunderstood or offensive to the recipients, suggestions are provided to modify such language. In this manner, the author of the message/document is able to assess the content and context of the message/document based on the intended recipients prior to sending the message/document thereby reducing the likelihood that the recipients will interpret the message/document in an untoward manner.

7 Claims, 4 Drawing Sheets

(56) References Cited

U.S. PATENT DOCUMENTS

| | | |
|---|---|---|
| 7,003,462 B2 | 2/2006 | Shambaugh et al. |
| 2007/0143410 A1 | 6/2007 | Kraft et al. |
| 2007/0250587 A1 | 10/2007 | Roberts |
| 2007/0282954 A1 | 12/2007 | Kim et al. |
| 2009/0259637 A1 | 10/2009 | Itoh |
| 2010/0082751 A1 | 4/2010 | Meijer et al. |
| 2010/0268682 A1 | 10/2010 | Lewis et al. |
| 2011/0055336 A1 | 3/2011 | Park |
| 2013/0110748 A1 | 5/2013 | Talati et al. |
| 2014/0089816 A1 | 3/2014 | DiPersia et al. |
| 2014/0163957 A1 | 6/2014 | Tesch et al. |

OTHER PUBLICATIONS

"Grammar Checker," http://www.gingersoftware.com/grammarcheck, 2012, pp. 1-5.

List of IBM Patents or Patent Applications Treated as Related, 2015, pp. 1-2.

Office Action for U.S Appl. No. 14/242,384 dated Nov. 24, 2015, pp. 1-13.

ent invention.

ANALYZING MESSAGES AND/OR DOCUMENTS TO PROVIDE SUGGESTIONS TO MODIFY MESSAGES AND/OR DOCUMENTS TO BE MORE SUITABLE FOR INTENDED RECIPIENTS

TECHNICAL FIELD

The present invention relates generally to communications, and more particularly to analyzing messages and/or documents to provide suggestions to modify messages and/or documents to be more suitable for the intended recipients.

BACKGROUND

There are various forms of communication between users of a computing device, such as via electronic mail ("e-mail"), instant messaging, social media (e.g., social networking sites), text messaging, etc. Oftentimes, messages or documents (e.g., word processing document) are composed and distributed to recipients in such a manner without fully understanding how the recipients will interpret the message or document. Due to the recipient's job role, cultural background or other external factors, the recipient may misunderstand, or in the worst case, be offended from the message/document (the phrase "message/document" as used herein refers to "message or document"). While applications have been developed to assist the author in constructing the message or document, such as checking for spelling (spell checker), checking for grammar correctness (grammar checker) and providing a list of words similar in meaning to an inputted word (thesaurus), such tools do not allow the author to assess the content and context of the message/document based on the intended recipients, such as based on the recipient's job role or cultural background. As a result of not being able to assess the content and context of the message/document based on the intended recipients prior to sending the message/document, the message/document may be interpreted by the recipients in an untoward manner.

BRIEF SUMMARY

In one embodiment of the present invention, a method for assisting authors in composing suitable messages or documents for intended recipients comprises identifying one or more recipients to receive a message or document. The method further comprises obtaining a profile to be used in analyzing the message or document to be sent to the one or more recipients, where the profile comprises a set of corrections and correlations to be applied to the message or document. Furthermore, the method comprises analyzing, by a processor, content of the message or document using the obtained profile. Additionally, the method comprises identifying one or more words, phrases, sentences or images in the message or document that are potentially misunderstood or offensive to the one or more recipients. In addition, the method comprises providing one or more suggestions to modify the identified one or more words, phrases, sentences or images in the message or document to no longer be misunderstood or offensive to the one or more recipients.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for assisting authors in composing suitable messages or documents for the intended recipients. In one embodiment of the present invention, the recipients intended to receive a message (e.g., e-mail) or document (e.g., word processing document) are identified prior to the author sending the message/document to the recipients. A profile to be used in analyzing the message or document to be sent to these recipients is obtained, where the profile contains a set of corrections and correlations to be applied to the message or document. The content of the message or document is analyzed using the obtained profile to assess for any language that may be misunderstood or offensive to the intended recipients. Upon identifying words, phrases, sentences or images in the message or document as being potentially misunderstood or offensive to the recipients, suggestions are provided to modify the words, phrases, sentences or images in the message or document identified as being potentially misunderstood or offensive to the recipients. In this manner, the author of the message or document is able to assess the content and context of the message/document based on the intended recipients prior to sending the message/document thereby reducing the likelihood that the recipients will interpret the message/document in an untoward manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
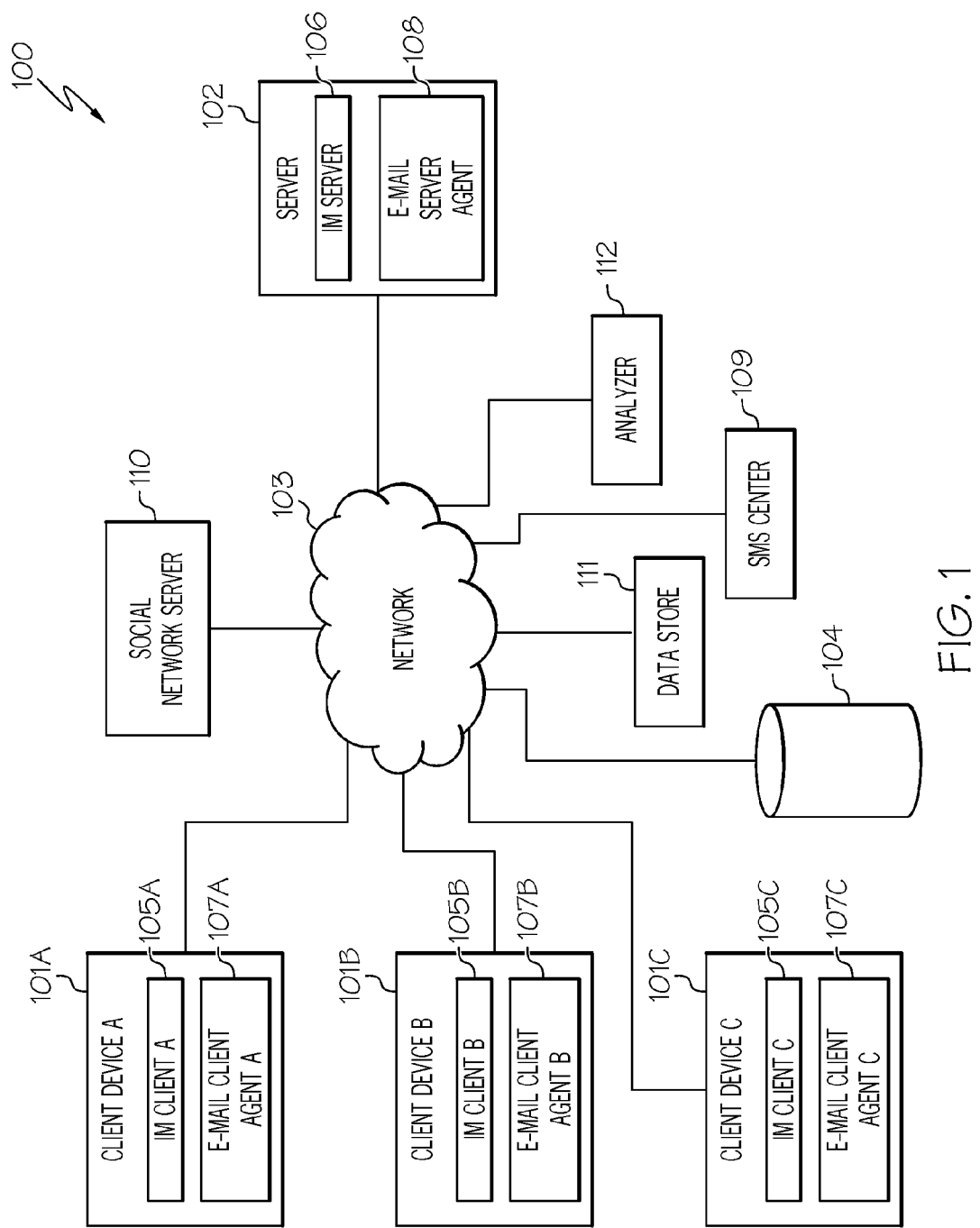
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, any user of client device 101 may be able to create, receive and send e-mails. Additionally, any user of client device 101 may be able to send and receive text messages, such as Short Message Services (SMS) messages. Furthermore, any user of client device 101 may be able to send documents (e.g., word processing documents), such as those stored in database 104 connected to network 103, to other client devices 101.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 105A-105C, respectively. Instant messaging clients 105A-105C may collectively or individually be referred to as instant messaging clients 105 or instant messaging client 105, respectively. Furthermore, server 102 includes a software agent, referred to herein as the Instant Messaging (IM) server 106. IM client 105 provides the functionality to send and receive instant messages. As messages are received, IM client 105 presents the messages to the user in a dialog window (or IM window). Furthermore, IM client 105 provides the functionality for client device 101 to connect to the IM server 106 which provides the functionality of distributing the instant messages to the IM clients 105 associated with each of the sharing users.

Client devices 101A-101C may further include a software agent, referred to herein as an e-mail client agent 107A-107C, respectively. E-mail client agents 107A-107C may collectively or individually be referred to as e-mail client agents 107 or e-mail client agent 107, respectively. Furthermore, server 102 may include a software agent, referred to herein as the e-mail server agent 108. E-mail client agent 107 enables the user of client device 101 to create, send and receive e-mails. E-mail server agent 108 is configured to receive e-mail messages from client devices 101 and distribute the received e-mail messages among the one or more client devices 101.

While the preceding description discusses each client device 101 as including an IM client 105 and an e-mail client agent 107, each client device 101 may not necessarily include each of these software agents. For example, some client devices 101 may only include an IM client 105; whereas, other client devices 101 may only include an e-mail client agent 107. In other words, each client device 101 may be able to perform some or all of the functions discussed herein, such as sending/receiving e-mails, sending/receiving instant messages, sending/receiving text messages, etc. Furthermore, while the preceding description discusses a single server 102 including the software agents, such as IM server 106 and e-mail server agent 108, multiple servers may be used to implement these services. Furthermore, each server 102 may not necessarily be configured to include all of these software agents, but only a subset of these software agents. For example, one particular server 102 may only include IM server 106; whereas, another particular server 102 may only include e-mail server agent 108.

System 100 further includes a Short Message Service (SMC) center 109 configured to relay, store and forward text messages, such as SMS messages, among client devices 101 through network 103.

System 100 further includes a social network server 110, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 110 is connected to network 103 by wire or wirelessly. While FIG. 1 illustrates a single social network server 110, it is noted for clarity that multiple servers may be used to implement the social networking and/or microblogging service.

System 100 further includes a data store 111 configured to store "profiles" used in analyzing the messages or documents to be sent to intended recipients to ensure that these messages/documents are understandable and not offensive to the intended recipients. These profiles include a set of corrections and correlations that are to be applied to the messages/documents as discussed further below. Data store 111 may be connected to network 103 either by wire or wirelessly.

Furthermore, system 100 includes an analyzer 112 connected to network 103 by wire or wirelessly. Analyzer 112 is configured to assist authors in composing suitable messages or documents for the intended recipients. That is, analyzer 112 is configured to assist authors to avoid using language that would be misunderstood, or at worst be offensive, to the intended recipients as discussed further below. In one embodiment, analyzer 112 may be utilized by multiple users of client devices 101. While the following description discusses analyzer 112 as being a unit utilized by multiple users of client devices 101, the principles of the present invention are not to be limited to such an architecture. Instead, the software used to assist authors to ensure that the messages/documents created by the author are understandable and not offensive to the intended recipients, as discussed further below, may reside within client device 101 of a single end user as opposed to residing within analyzer 112. A description of the hardware configuration of analyzer 112 is provided below in connection with FIG. 2.

System 100 is not to be limited in scope to any one particular network architecture. System 100 may include any number of client devices 101, servers 102, networks 103, databases 104, SMS centers 109, social network servers 110, data stores 111 and analyzers 112.

Figure 2:
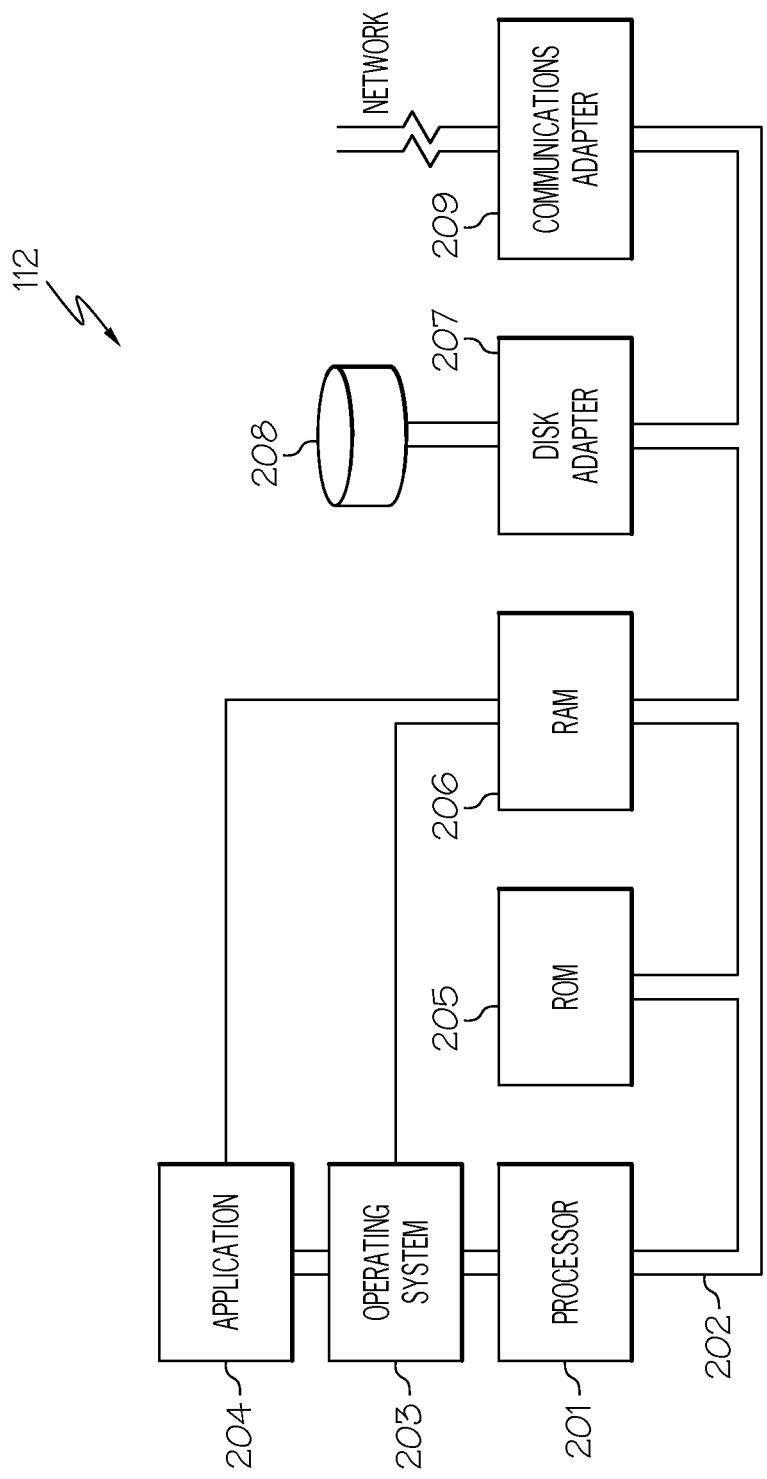
FIG. 2 illustrates a hardware configuration of an analyzer in accordance with an embodiment of the present invention.

Referring now to FIG. 2, FIG. 2 illustrates a hardware configuration of analyzer 112 (FIG. 1) which is representative of a hardware environment for practicing the present invention. Referring to FIG. 2, analyzer 112 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assisting authors to ensure that the messages/documents created by the author are understandable and not offensive to the intended recipients as discussed further below in association with FIGS. 3A-3B.

Referring again to FIG. 2, read-only memory ("ROM") 205 is coupled to system bus 202 and includes a basic input/output system ("BIOS") that controls certain basic functions of analyzer 112. Random access memory ("RAM") 206 and disk adapter 207 are also coupled to system bus 202. It should be noted that software components including operating system 203 and application 204 may be loaded into RAM 206, which may be analyzer's 112 main memory for execution. Disk adapter 207 may be an integrated drive electronics ("IDE") adapter that communicates with a disk unit 208, e.g., disk drive. It is noted that the program for assisting authors to ensure that the messages/documents created by the author are understandable and not offensive to the intended recipients, as discussed further below in association with FIGS. 3A-3B, may reside in disk unit 208 or in application 204.

Analyzer 112 may further include a communications adapter 209 coupled to bus 202. Communications adapter 209 interconnects bus 202 with an outside network (network 103 of FIG. 1) thereby enabling analyzer 112 to communicate with client devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are various forms of communication between users of a computing device, such as via electronic mail ("e-mail"), instant messaging, social media (e.g., social networking sites), text messaging, etc., Oftentimes, messages or documents (e.g., word processing document) are composed and distributed to recipients in such a manner without fully understanding how the recipients will interpret the message or document. Due to the recipient's job role, cultural background or other external factors, the recipient may misunderstand, or in the worst case, be offended from the message/document (the phrase "message/document" as used herein refers to "message or document"). While applications have been developed to assist the author in constructing the message or document, such as checking for spelling (spell checker), checking for grammar correctness (grammar checker) and providing a list of words similar in meaning to an inputted word (thesaurus), such tools do not allow the author to assess the content and context of the message/document based on the intended recipients, such as based on the recipient's job role or cultural background. As a result of not being able to assess the content and context of the message/document based on the intended recipients prior to sending the message/document, the message/document may be interpreted by the recipients in an untoward manner.

The principles of the present invention provide a means for allowing the author of a message or document to assess the content and context of the message/document based on the intended recipients prior to sending the message/document thereby reducing the likelihood that the recipients will interpret the message/document in an untoward manner as discussed further below in connection with FIGS. 3A-3B.

Figure 3A:
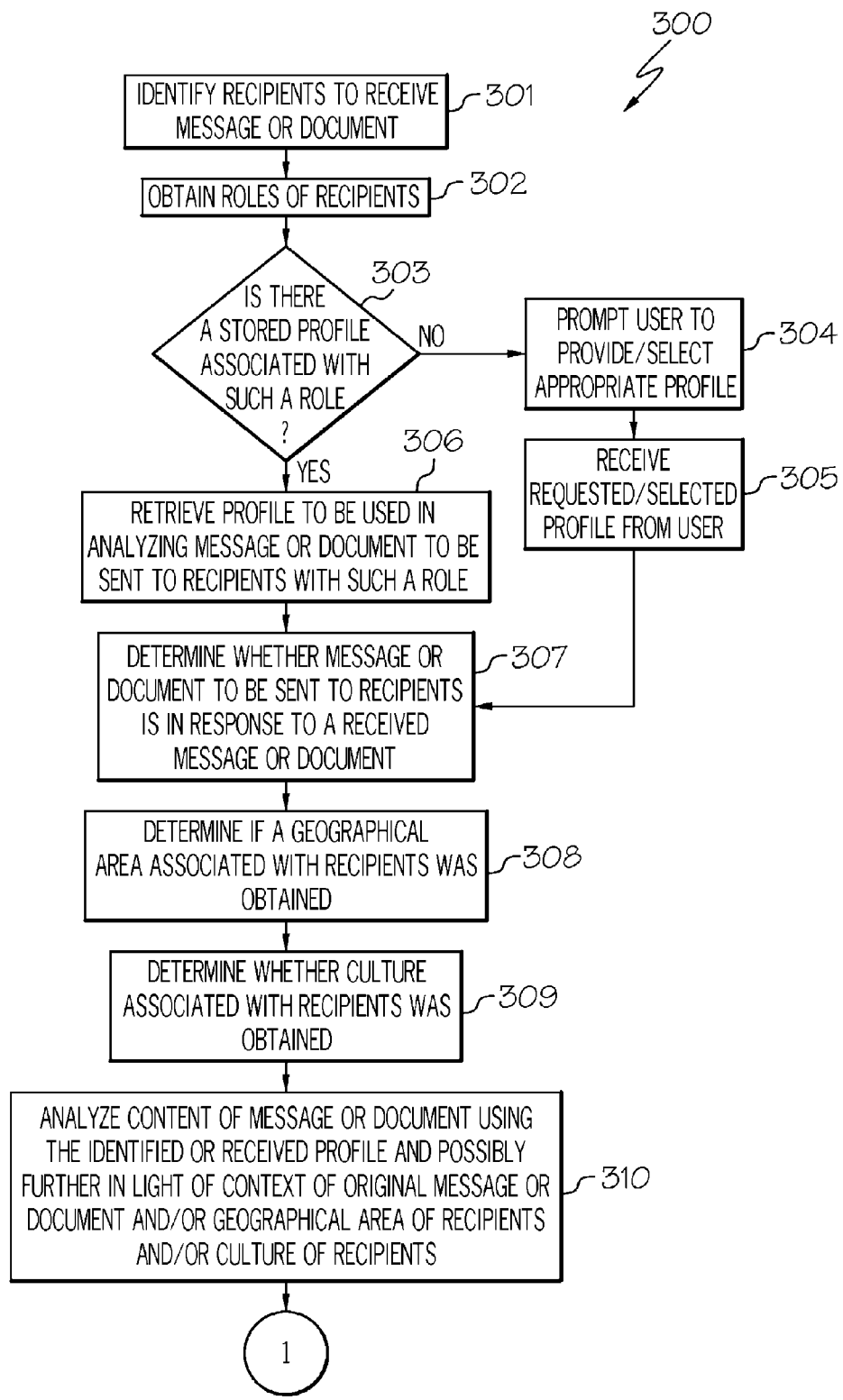
FIGS. 3A-3B are a flowchart of a method for assisting authors to ensure that the messages/documents created by the author are understandable and not offensive to the intended recipients in accordance with an embodiment of the present invention.
Figure 3B:
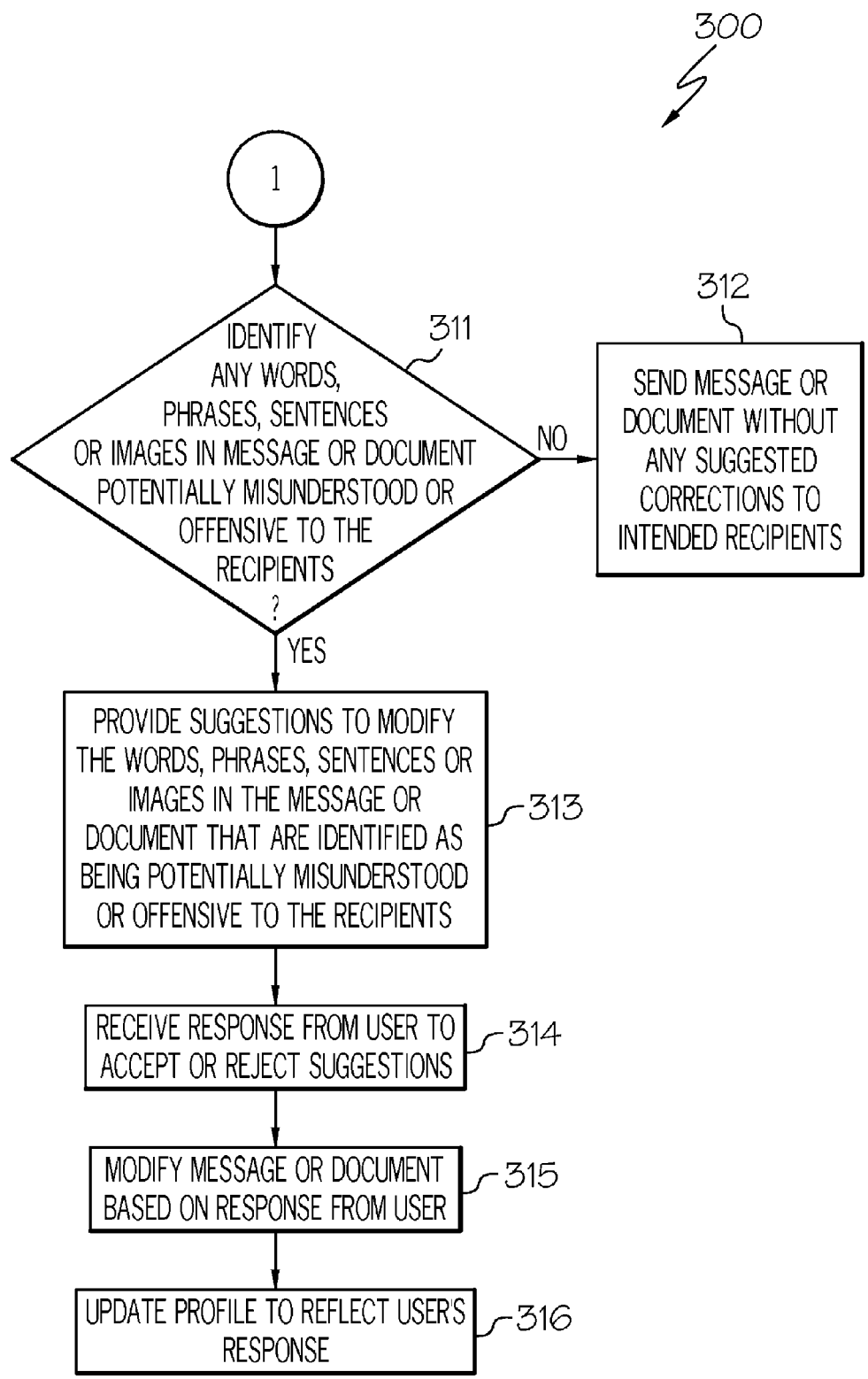

FIGS. 3A-3B are a flowchart of a method 300 for assisting authors (e.g., user of client device 101A) to ensure that the messages/documents created by the author are understandable and not offensive to the intended recipients in accordance with an embodiment of the present invention.

Referring to FIG. 3A, in conjunction with FIG. 1-2, in step 301, analyzer 112 identifies the recipients to receive a message or document created by the author (e.g., user of client device 101A) prior to the author sending the message/document to the recipients. A "message," as used herein includes any form of text communication, including, but not limited to, e-mail, instant message, post, SMS message, etc. A "document," as used herein, refers to a written or drawn representation of thoughts, such as a word processing document. In one embodiment, analyzer 112 is configured to scan the recipient list (e.g., TO field, CC field, BCC field) of the message (e.g., e-mail, instant message) to identify the recipients of the message being created by the author (e.g., user of client device 101A). In another embodiment, analyzer 112 is configured to generate a prompt to be displayed to the author (e.g., prompt is displayed on the display of client device 101A) requesting the author to provide the recipients to receive the composed message or document.

In step 302, analyzer 112 obtains the roles (e.g., parent, teacher, friend, boss, sibling) of the recipients to receive the message/document created by the author. In one embodiment, analyzer 112 obtains the roles of the recipients (e.g., executive, manager, peer colleague) by performing a look-up of the recipients, such as via social media websites, such as LinkedIn®. In another embodiment, analyzer 112 obtains the roles of the recipients by performing a lookup in an employee directory. In another embodiment, analyzer 112 is configured to generate a prompt to be displayed to the author (e.g., prompt is displayed on the display of client device 101A) requesting the author to provide the roles of the recipients to receive the composed message or document.

In step 303, a determination is made by analyzer 112 as to whether there is a stored profile associated with the obtained role. A "profile," as used herein refers to a set of corrections and correlations that are to be applied to the messages/documents. These profiles are used by analyzer 112 to identify any language that may be misunderstood, or in the worst case be offensive, to the intended recipients. In one embodiment, these profiles are customizable and are able to be updated to provide a more accurate assessment as to whether there exists any language in the message/document that may be misunderstood or offensive. For example, in one embodiment, "formal" and "informal" profiles may be provided to the user for customization. "Formal" profiles refer to profiles that include pre-determined words or phrases that may not be appropriate when communicating in a formal sense. For example, common phrases, such as "beef up" would be flagged, such as in the sentence, "Let's beef up test coverage." A suggestion that may be provided by the formal profile, as discussed further below, is to state "enhance test coverage" as opposed to "beef up test coverage." If an appropriate suggestion is not found in the profile to replace the flagged word/phrase, then the author may be presented with an opportunity to provide a replacement for the flagged word/phrase. If a replacement is made, the profile would store this correction and provide the corrected word on the next encounter. Formal profiles may also be used to insert phrases or expressions to improve the meaning of the author's thought to reduce any confusion.

Furthermore, the "formal" profile may be further customized by allowing the user (e.g., user of client device 101A) to copy it and rename it (e.g., "executive profile") and add more phrases and corrections that are specific to communicating with executives. The executive profile would grow and become customized based on remembering correction choices that the user makes while using this profile. As a result, the profile will effectively grow in intelligence and accuracy.

Informal profiles, on the other hand, refer to profiles that include pre-determined words or phrases that may not be appropriate when communicating in an informal sense. These informal profiles may be customized in a similar manner as customizing formal profiles as discussed above. Furthermore, informal profiles, as with formal profiles, may be used to insert phrases or expressions to improve the meaning of the author's thought to reduce any confusion. For example, a company marketing towards the demographic market of teenagers may start using an informal profile and adapting the profile to use phrases and terms that a teenager may use, such as "my bad" for "my mistake" or "chillin'" for "relaxing." As the profile is populated with more corrections, the profile will effectively grow in intelligence and accuracy.

In one embodiment, the profiles, as discussed above, may be stored in data store 111. As discussed above, analyzer 112 determines whether there is a stored profile for the recipients with the obtained role in step 303. For example, if a role for a recipient(s) is an executive, then analyzer 112 will search data store 111 for a profile pertaining to executives.

If there is not a stored profile for the received role (e.g., manager), then, in step 304, analyzer 112 prompts the user (e.g., user of client device 101A) to provide or select the appropriate profile. In one embodiment, various profiles stored in data store 111 are provided to the user, and the user selects one of these profiles to be used in assessing the suitability for sending the message/document to those recipient(s).

In step 305, analyzer 112 receives the requested/selected profile from the user.

If, however, there is a stored profile associated with the received role (e.g., manager), then, in step 306, analyzer 112 retrieves the profile (e.g., manager profile) from data store 111 to be used in analyzing the message/document to be sent to the recipient(s) with such a role. To be clear, since the intended recipients (recipients identified in step 301) may be assigned different roles, analyzer 112 may obtain different profiles to be used among the various recipients. Steps 303-306 are to be implemented by analyzer 112 for each role assigned to one or more of the recipients identified in step 301. Steps 307-316, as discussed below, are to be implemented by analyzer 112 for each profile obtained for the appropriate recipients. Furthermore, while the discussion of method 300 includes a step pertaining to obtaining a role of the recipients, the principles of the present invention are not to be limited as requiring such a step. For example, the author of the message/document may simply provide or select a profile to be used in assessing the suitability for sending the message/document to the identified recipient(s) (where analyzer 112 or the user may identify the recipients to receive the message/document that will be assessed using the provided/selected profile).

Upon receiving the requested profile from the user in step 305 or upon retrieving the profile to be used in analyzing the message/document to be sent to the recipient(s) with such a role in step 306, analyzer 112 determines whether the message or document to be sent to the targeted recipient(s) is in response to a received message or document in step 307. Oftentimes, when communicating between individuals, it is helpful to communicate in a similar linguistic "tone" or language, such as using similar grammar choices and vocabulary. As a result, it may be beneficial to assess the original message or document for words, phrases and tones used. For example, if a message is received by a user of client device 101, such as an e-mail message, then when the user selects to "reply" to the original message, the original message may be analyzed for the words, phrases and tones used. Analyzer 112 may then analyze the content of the message/document to be sent to the recipients identified in step 301 using the profile in light of the context of the original message/document as discussed further below. For example, the user may be presented with possible corrections based on the context of the original message/document. The user's response to these presented corrections (e.g., accept or reject) may be used to update the profile thereby improving the intelligence and accuracy of the profile in analyzing the message/document for appropriate word usage as discussed further below.

In step 308, analyzer 112 determines whether a geographical area associated with the recipients was obtained. For example, the user (e.g., user of client device 101A) may provide the geographical area (e.g., London) of the recipients. In another example, analyzer 112 may obtain the geographical area associated with the recipients based on the country code (e.g., "GB" for "Great Britain") contained in the address (e.g., e-mail address) of the recipients. If analyzer 112 obtains a geographical area associated with the recipients, then analyzer 112 analyzes the content of the message or document using the profile (retrieved in step 306 or received in step 305) in light of the geographical area of the recipients as discussed further below.

In step 309, analyzer 112 determines whether a culture associated with the recipients was obtained. For example, the user (e.g., user of client device 101A) may provide the culture (e.g., Japanese) of the recipients. In another example, analyzer 112 may obtain the culture associated with the recipients based on the country code (e.g., "JP" for Japan") contained in the address (e.g., e-mail address) of the recipients. If analyzer 112 obtains a culture associated with the recipients, then analyzer 112 analyzes the content of the message or document using the profile (retrieved in step 306 or received in step 305) in light of the culture of the recipients as discussed further below.

In step 310, analyzer 112 analyzes the content of the message or document using the retrieved or received profile and possibly further in light of the context of the original message or document (if the message or document to be sent to the recipients is in response to a received message or document) and/or geographical area of the recipients (if the geographical area of the recipients was obtained) and/or culture of the recipients (if the culture of the recipients was obtained). In this manner, the author of the message or document is able to assess the content and context of the message/document based on the intended recipients prior to sending the message/document thereby reducing the likelihood that the recipients will interpret the message/document in an untoward manner.

Referring now to FIG. 3B, in conjunction with FIGS. 1-2, in step 311, a determination is made by analyzer 112 as to whether any words, phrases, sentences or images in the message or document are identified as being potentially misunderstood or offensive to the recipients. For example, in the sentence "This is the meat and potatoes of the proposal," the phrase "meat and potatoes" may be flagged as potentially being misunderstood. A suggested alternative provided by analyzer 112 to the phrase "meat and potatoes" may be "real detail" so that the sentence would now read "This is the real detail of the proposal." In another example, in the sentence "We need to beef up the development budget," the phrase "beef up" may be flagged as a cow may be considered to a sacred animal in certain cultures. As a result, analyzer 112 may suggest replacing the phrase "beef up" with the term "increase" thereby rewriting the sentence to "We need to increase the development budget." In another example, the phrase "real bucks" in the sentence "Let's talk about real bucks" may be flagged as potentially being misunderstood. As a result, analyzer 112 may suggest replacing the phrase "real bucks" with the phrase "the money part" so that the sentence would now read "Let's talk about the money part." In a further example, the sentence "Why don't you do it?" may be flagged in a document used for an executive or boss as such language may not be deemed to be appropriate in a work relationship. As a result, analyzer 112 may suggest rewriting the sentence as "Can you please take care of it?" In an additional example, the term "subway" may be flagged as not being the most effective way with communicating with someone in London as the subway in London is commonly referred to as the "Tube" in London. As a result, analyzer 112 may suggest replacing the term "subway" with the term "Tube."

If there are no words, phrases, sentences or images in the message or document that are identified as being potentially misunderstood or offensive to the recipients, then, in step 312, analyzer 112 sends the message or document without any suggested corrections to the intended recipients.

However, if there are words, phrases, sentences or images in the message or document that are identified as being potentially misunderstood or offensive to the recipients, then, in step 313, analyzer 112 provides suggestions to the user of client device 101 (i.e., the author of the message or document) to modify the words, phrases, sentences or images in the message or document that are identified as being potentially misunderstood or offensive to the recipients as discussed above.

In step 314, analyzer 112 receives a response from the user (i.e., the author of the message or document) to accept or reject these suggestions.

In step 315, analyzer 112 modifies the message or document based on the responses received from the user. For example, if the user accepted the suggestion of replacing the term "subway" with the term "Tube," then analyzer 112 modifies the message or document accordingly.

In step 316, analyzer 112 updates the profile to reflect the user's response thereby allowing the profile to grow in intelligence and accuracy as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisting authors in composing suitable messages or documents for intended recipients, the method comprising:
   identifying one or more recipients to receive a message or document;
   obtaining a profile to be used in analyzing said message or document to be sent to said one or more recipients, wherein said profile comprises a set of corrections and correlations to be applied to said message or document;
   analyzing, by a processor, content of said message or document using said obtained profile;
   identifying one or more words, phrases, sentences or images in said message or document that are potentially misunderstood or offensive to said one or more recipients; and
   providing one or more suggestions to modify said identified one or more words, phrases, sentences or images in said message or document to no longer be misunderstood or offensive to said one or more recipients.

2. The method as recited in claim 1 further comprising:
   obtaining a role of said one or more recipients;
   retrieving said profile associated with said role to be used in analyzing said message or document to be sent to said one or more recipients.

3. The method as recited in claim 1 further comprising:
   determining whether said message or document is in response to a received message or document; and
   analyzing said content of said message or document using said obtained profile and in light of a context of said received message or document in response to said message or document being in response to said received message or document.

4. The method as recited in claim 1 further comprising:
   determining whether a geographical area associated with said one or more recipients is obtained; and
   analyzing said content of said message or document using said obtained profile and in light of said geographical area associated with said one or more recipients in response to obtaining said geographical area associated with said one or more recipients.

5. The method as recited in claim 1 further comprising:
   determining whether a culture associated with said one or more recipients is obtained; and
   analyzing said content of said message or document using said obtained profile and in light of said culture associated with said one or more recipients in response to obtaining said culture associated with said one or more recipients.

6. The method as recited in claim 1 further comprising:
   receiving a response from an author of said message or document to accept or reject said one or more suggestions; and
   modifying said message or document based on said response from said author.

7. The method as recited in claim 6 further comprising:
   updating said profile to reflect said author's response.

\* \* \* \* \*